US011521097B2

(12) United States Patent
Ishikawa

(10) Patent No.: US 11,521,097 B2
(45) Date of Patent: Dec. 6, 2022

(54) SPARSE MODELING FOR OPTIMIZING SENSOR PLACEMENT

(71) Applicant: INTERNATIONAL BUSINESS MACHINES CORPORATION, Armonk, NY (US)

(72) Inventor: Tatsuya Ishikawa, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 766 days.

(21) Appl. No.: 16/279,124

(22) Filed: Feb. 19, 2019

(65) Prior Publication Data

US 2020/0265330 A1   Aug. 20, 2020

(51) Int. Cl.
*G06F 17/11*   (2006.01)
*G06F 17/16*   (2006.01)
*G06N 7/00*    (2006.01)
*A01G 9/24*    (2006.01)

(52) U.S. Cl.
CPC .............. *G06N 7/00* (2013.01); *A01G 9/24* (2013.01); *G06F 17/11* (2013.01); *G06F 17/16* (2013.01)

(58) Field of Classification Search
CPC . G06N 7/00; G06N 20/00; A01G 9/24; G06F 17/11; G06F 17/16; G06F 17/18; Y02A 40/25; G06K 9/00624; G06K 9/6217; G06V 20/00
USPC ............................................................ 703/2
See application file for complete search history.

(56) References Cited

U.S. PATENT DOCUMENTS

| 10,340,734 | B2 * | 7/2019 | Yan ................... G06K 9/00563 |
| 2016/0259887 | A1 * | 9/2016 | Min ....................... G16B 40/20 |
| 2018/0285317 | A1 * | 10/2018 | Nishida ................... G06F 17/18 |
| 2019/0244125 | A1 * | 8/2019 | Samadani ............... G06F 17/18 |
| 2019/0244126 | A1 * | 8/2019 | Samadani ............... G06F 17/18 |

(Continued)

FOREIGN PATENT DOCUMENTS

| CN | 107219347 A | 9/2017 |
| CN | 107843333 A | 3/2018 |
| CN | 107843873 A | 3/2018 |

OTHER PUBLICATIONS

Alberto Castellini et al., "EXPO-AGRI: Smart automatic greenhouse control", 2017, IEEE Biomedical Circuits and Systems Conference (BioCAS), 4 pages.*

(Continued)

*Primary Examiner* — Juan C Ochoa
(74) *Attorney, Agent, or Firm* — Tutunjian & Bitetto, P.C.; Randy Emilio Tejeda

(57) ABSTRACT

A computer-implemented method is presented for arranging a plurality of sensors in a three-dimensional space. The method includes obtaining actual measured values from the plurality of sensors placed in the three-dimensional space, applying group regularization to create one or more models providing consistency between the actual measured values and corresponding predicted values, selecting a model from the one or more models having a given number of groups, wherein each group has significant coefficients, and, according to the selected model, arranging a subset of the plurality of sensors at locations corresponding to the significant coefficients to predict one or more parameters in the three-dimensional space.

17 Claims, 7 Drawing Sheets

(56) References Cited

U.S. PATENT DOCUMENTS

2021/0149374 A1* 5/2021 Takahashi .......... G05B 19/4183

OTHER PUBLICATIONS

Mingshan Xie et al., "Sparse Sensor Placement for Interpolated Data Reconstruction Based on Iterative Four Subregions in Sensor Networks", 2019, Journal of Sensors, vol. 2019, Article ID 7209349, 16 pages.*
Kosuke Nishida et al., "Household energy consumption prediction by feature selection of lifestyle data", 2017, IEEE International Conference on Smart Grid Communications (SmartGridComm), 6 pages.*
Christian Edlich-Muth et al., "Phenomic prediction of maize hybrids", 2016, Biosystems 146, pp. 102-109.*
Brunton et al., "Sparse Sensor Placement Optimization for Classification", SIAM Journal on Applied Mathematics. Oct. 27, 2016. vol. 76 No. 5. pp. 2099-2122.
Krause et al., "Near-Optimal Sensor Placements in Gaussian Processes: Theory, Efficient Algorithms and Empirical Studies", Journal of Machine Learning Research. Feb. 9, 2008. pp. 235-284.
Liu et al., "A Statistical Methodology for Noise Sensor Placement and Full-Chip Voltage Map Generation", Proceedings of the 52nd ACM/EDAC/IEEE Annual Design Automation Conference. Jun. 7, 2015. pp. 1-6.
Sankaran et al., "Group Sparse Autoencoder", Image and Vision Computing. Preprinted Mar. 15, 2017. pp. 1-13.
Grace Period Disclosure: Tatsuya Ishikawa, "A Sparse Modeling Approach for Optimizing Sensor Placements", 2018 INFORMS Annual Meeting. Pheonix, AZ. Nov. 6, 2018.

* cited by examiner

410

Group LASSO Model Equations $$y_{i1} = x_{i1}w_{11} + x_{i2}w_{21} + \cdots + x_{iM}w_{M1} + \varepsilon_{i1}$$

$$y_{i2} = x_{i1}w_{12} + x_{i2}w_{22} + \cdots + x_{iM}w_{M2} + \varepsilon_{i2}$$

...

$$y_{iL} = x_{i1}w_{1L} + x_{i2}w_{2L} + \cdots + x_{iM}w_{ML} + \varepsilon_{iL}$$

Objective Function $$\frac{1}{2N} \|Y - XW\|_{Fro}^2 + \alpha \sum_{j=1}^{M} \|w_j\|_2$$

FIG. 4

SPARSE MODELING FOR OPTIMIZING SENSOR PLACEMENT

STATEMENT REGARDING PRIOR DISCLOSURES BY THE INVENTOR OR A JOINT INVENTOR

The following disclosure is submitted under 35 U.S.C. § 102(b)(1)(A): DISCLOSURE: Published in INFORMS Annual Meeting 2018 at Phoenix USA on Nov. 6, 2018.

BACKGROUND

The present invention relates generally to data processing, and more specifically, to sparse modeling for optimizing sensor placement.

The ability to make sense of large amounts of data is a challenging task. With the ever-increasing numbers of available data sources and rapid, ongoing enhancements made in the computing power of data generation devices, as well as the wide variety of types of data (e.g., both structured and unstructured) that can be collected today, managing voluminous data can be challenging. Additionally, not all of the collected data is valuable. In fact, only a small subset of the data may be valuable to an organization. Thus, in certain instances, such voluminous data needs to be filtered in order to obtain the data that is valuable to the organization. Filtering of the data can include employing less sensors in data collection tasks.

SUMMARY

In accordance with an embodiment, a method is provided for arranging a plurality of sensors in a three-dimensional space. The method includes obtaining actual measured values from the plurality of sensors placed in the three-dimensional space, applying group regularization to create one or more models providing consistency between the actual measured values and corresponding predicted values, selecting a model from the one or more models having a given number of groups, wherein each group has significant coefficients, and, according to the selected model, arranging a subset of the plurality of sensors at locations corresponding to the significant coefficients to predict one or more parameters in the three-dimensional space.

In accordance with another embodiment, a system is provided for arranging a plurality of sensors in a three-dimensional space. The system includes a memory and one or more processors in communication with the memory configured to obtain actual measured values from the plurality of sensors placed in the three-dimensional space, apply group regularization to create one or more models providing consistency between the actual measured values and corresponding predicted values, select a model from the one or more models having a given number of groups, wherein each group has significant coefficients, and, according to the selected model, arrange a subset of the plurality of sensors at locations corresponding to the significant coefficients to predict one or more parameters in the three-dimensional space.

In accordance with yet another embodiment, a non-transitory computer-readable storage medium comprising a computer-readable program for constructing a trained model for arranging a plurality of sensors in a three-dimensional space is presented. The non-transitory computer-readable storage medium performs the steps of obtaining actual measured values from the plurality of sensors placed in the three-dimensional space, applying group regularization to create one or more models providing consistency between the actual measured values and corresponding predicted values, selecting a model from the one or more models having a given number of groups, wherein each group has significant coefficients, and, according to the selected model, arranging a subset of the plurality of sensors at locations corresponding to the significant coefficients to predict one or more parameters in the three-dimensional space.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein:

FIG. 4 is a block/flow diagram illustrating example group least absolute shrinkage and selection operator (LASSO) model equations, in accordance with an embodiment of the present invention;

Throughout the drawings, same or similar reference numerals represent the same or similar elements.

DETAILED DESCRIPTION

Embodiments in accordance with the present invention provide methods and devices for employing sparse models for monitoring tasks. Sparse models provide theories and tools for signal acquisition and signal processing applications. A sparse model assumes that a signal, when transformed to an appropriate basis, has very few significant coefficients that model signal energy. Promoting sparsity in some appropriate domain is can help reduce the number of sensors employed to collect data, such as, e.g., but not limited to, temperature data.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
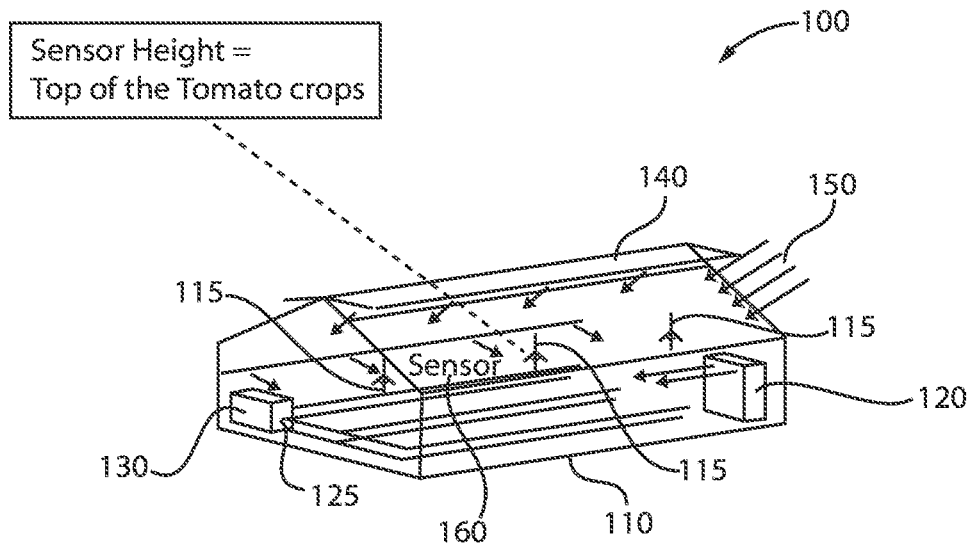
FIG. 1 is an exemplary greenhouse used for optimizing sensor placements, in accordance with embodiments of the present invention.

FIG. 1 is an exemplary greenhouse used for optimizing sensor placements, in accordance with embodiments of the present invention.

An agriculture system 100 can include a greenhouse 110, which can include a heat pump 120, a heater with ducting 125, and a side window 130. The greenhouse 110 can further include a skylight 140 to receive solar radiation 150. The greenhouse 110 can include a plurality of different types of crops. In one example, the crops can be tomato crops 115.

A plurality of sensors 160 can be positioned or placed in proximity to the crops 115 within the greenhouse 110. The plurality of sensors 160 can be placed anywhere within the vicinity of the greenhouse 110. Sensors 160 can also be placed near the skylight 140 and/or near the side window 130. Thus, there could be sensors 160 that monitor equipment operation. In other words, sensors 160 can be used to monitor, e.g., opening/closing of side window 130 and/or skylight 140. As a result, sensors 160 are not limited to only temperature sensors.

In greenhouse farming, temperature is one of the most important controllable variables or parameters for crop growth. However, farmers often operate the equipment with a limited knowledge regarding actual temperature distributions. Deploying a large number of sensors can be helpful. However, such strategy can be expensive and can also obstruct the farmer's work.

To minimize the need for such intensive measurements, the exemplary embodiments of the present invention employ a model that predicts one or more parameters from a small number or subset of sensors. The parameters can include temperature parametres, such as temperature distribution. The exemplary embodiments use variable selection techniques to select a subset of sensors. In particular, a sparse modeling approach for variable selections can be used. One such sparse modeling approach is referred to as a multi-task least absolute shrinkage and selection operator (LASSO) approach. The multi-task LASSO approach will be described below with reference to FIG. 4.

Sparse models are models where only a small fraction of parameters are non-zero, which arises frequently in machine learning. Sparsity is beneficial in several ways. Sparse models are more easily interpretable by humans and sparsity can yield statistical benefits.

In statistical modeling, regression analysis is a set of statistical processes for estimating the relationships among variables. It includes many techniques for modeling and analyzing several variables, when the focus is on the relationship between a dependent variable and one or more independent variables (or predictors). More specifically, regression analysis helps one understand how the value of the dependent variable (or criterion variable) changes when any one of the independent variables is varied, while the other independent variables are held fixed.

Most commonly, regression analysis estimates the conditional expectation of the dependent variable given the independent variables, that is, the average value of the dependent variable when the independent variables are fixed. A function of the independent variables called the regression function is to be estimated. In regression analysis, it is also of interest to characterize the variation of the dependent variable around the prediction of the regression function using a probability distribution.

Regression analysis is widely used for prediction and forecasting, where its use has substantial overlap with the field of machine learning. Regression analysis is also used to understand which among the independent variables are related to the dependent variable, and to explore the forms of these relationships.

In statistics and machine learning, lasso (least absolute shrinkage and selection operator; also Lasso or LASSO) is a regression analysis method that performs both variable selection and model fitting. LASSO was originally formulated for least squares models and this simple case reveals a substantial amount about the behavior of the estimator. It also reveals that (like standard linear regression) the coefficient estimates need not be unique if covariates are collinear. LASSO was introduced in order to improve the prediction accuracy and interpretability of regression models by altering the model fitting process to select only a subset of the provided covariates for use in the final model rather than using all of them. Thus, according to the exemplary embodiments of the present invention, a subset of temperature sensors can be used to predict temperature distributions within a structure, such as a greenhouse, to better determine crop information, such as crop yields.

Figure 2:
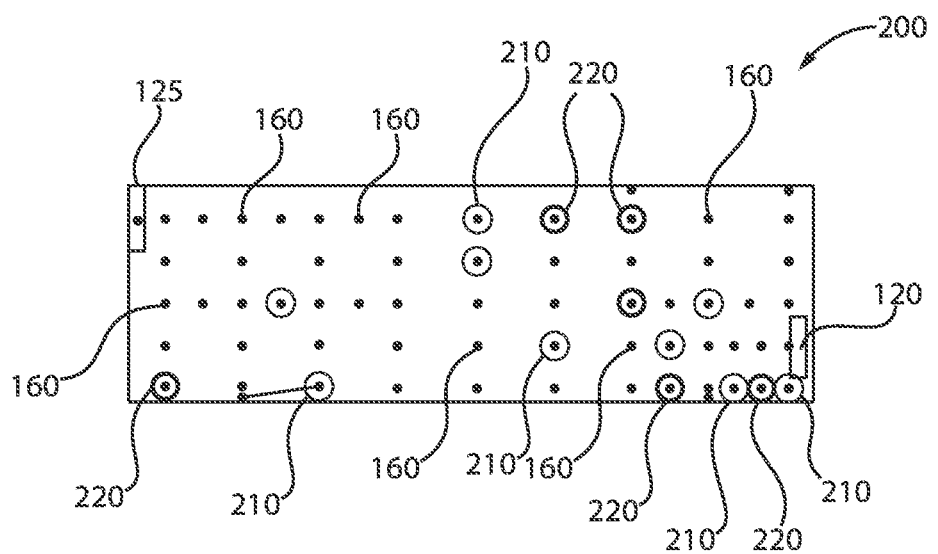
FIG. 2 is an exemplary map of temperature sensor positions within the greenhouse, in accordance with embodiments of the present invention.

FIG. 2 is an exemplary map of temperature sensor positions within the greenhouse, in accordance with embodiments of the present invention.

The sensor map 200 depicts a plurality of sensors 160 positioned in a grid formation within the greenhouse 110. In one example, sensors are positioned adjacent crops 115. When prior approaches (e.g., greedy submodular maximization for mutual information) are employed to determine which sensors to select to determine temperature distribution within the greenhouse 110, the prior approaches selected sensors 210.

When the current approach (e.g., multi-task group LASSO) is employed to determine which sensors to select to determine temperature distribution within the greenhouse 110, the current approach selected sensors 220 (that being a different subset of sensors). For example, sensors 220 near the skylight 140 and side window 130 were also selected based on the multi-task group LASSO approach, and in contrast to the greedy submodular maximization for mutual information approach.

The selection of sensors 220 provided for a more accurate temperature distribution observation. In fact, in experiments, the combined or aggregated selected sensors 220 provided for a more accurate temperature distribution observation than sensors 210. In other words, the detected temperature distribution was the same or very similar to the measured temperature distribution. Therefore, the multi-task group LASSO approach allows for better selection of sensors within a structure to provide for a highly accurate prediction of the temperature distribution within the structure, such as greenhouse 110. The current model thus accurately predicts the temperature distribution from a small number or subset of best-suited sensors.

Figure 3:
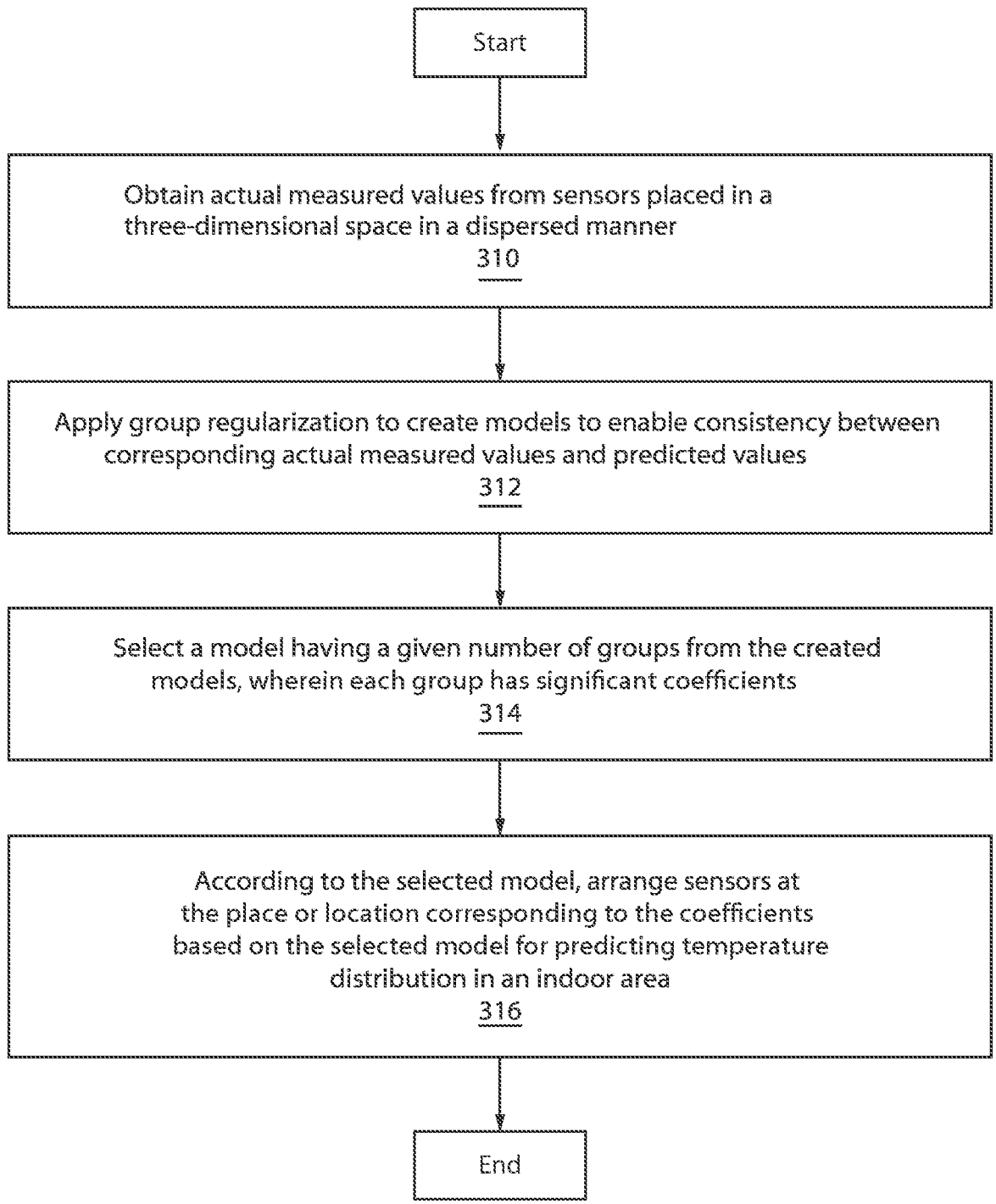
FIG. 3 is a block/flow diagram illustrating an example method for employing a sparse modeling approach for optimizing sensor placements, in accordance with an embodiment of the present invention.

FIG. 3 is a block/flow diagram illustrating an example method for employing a sparse modeling approach for optimizing sensor placements, in accordance with an embodiment of the present invention.

At block 310, obtain N sets of actual measured values $x_{ij}$'s (i=1, ..., N; j=1, ..., M) from M sensors placed in a three-dimensional space in a dispersed manner.

At block 312, apply group regularization to create models to enable consistency between corresponding actual measured values $x_{ij}$'s and predicted values $y_{ik}$'s (k=1, ..., L).

At block 314, select a model having a given number (say S) of groups from the created models, wherein the model has S groups or vectors of significant coefficient $w_j=(w_{j1}, \ldots, w_{jL})^T$.

At block 316, according to the selected model, arrange S sensors at the place or location corresponding to the significant coefficient vectors $w_j$.

FIG. 4 is a block/flow diagram illustrating example group least absolute shrinkage and selection operator (LASSO) model equations 410, in accordance with an embodiment of the present invention.

The group LASSO model equations for i-th data can be given as follows:

$$y_{i1} = x_{i1}w_{11} + x_{i2}w_{21} + \ldots + x_{iM}w_{M1} + \varepsilon_{i1}$$
$$y_{i2} = x_{i1}w_{12} + x_{i2}w_{22} + \ldots + x_{iM}w_{M2} + \varepsilon_{i2}$$
$$\ldots$$
$$y_{iL} = x_{i1}w_{1L} + x_{i2}w_{2L} + \ldots + x_{iM}w_{ML} + \varepsilon_{iL}$$

where $y_{ik}$ and $x_{ij}$ are k-th predicted value or outcome and j-th measured value, respectively for i-th data, $w_{jk}$ is a coefficient to be determined by minimizing an objective function, and $\varepsilon_{ik}$ is a noise or an error.

The objective function can be given as a combination of a prediction error term and a group regularization term as follows:

$$\frac{1}{2N}\|Y - XW\|_{Fro}^2 + \alpha \sum_{j=1}^{M} \|w_j\|_2$$

where X is a design matrix where the (i,j)-th element is the j-th observation of the i-th sample, Y is a matrix where the (i,k)-th element is the k-th prediction of the i-th sample, W is a coefficient matrix where the (j,k)-th element is the coefficient corresponding to the j-th observation and the k-th prediction, α is a regularization parameter, and $\|\ \|_{Fro}$ and $\|\ \|_2$ are Frobenius norm and 2-norm, respectively.

The M groups of weight coefficients for the multi-task group LASSO are given as:

$$\{w_j\}_{k=1}^{L}, j=1, \ldots M.$$

Then, in order to obtain groups or vectors of significant coefficients, the multi-task group LASSO is applied in a reconstructive formulation for a set of sensor data as follows:

Let a set of predictions be a set or subset of observations, e.g., L=M, $y_{ij}=x_{ij}$, j=1, ..., M, i=1, ..., N, in a multi-task group LASSO model. In another example, if some observations do not need to be reconstructed, a set of predictors can be set as L<M, $y_{i1}=x_{i1}$, $y_{i2}=x_{i3}$, ..., $y_{1,M-1}=x_{iM}$, i=1, ..., N (here the 2nd observation $x_{i2}$ does not need to be reconstructed and is not included as $y_{ij}$, thus L=M−1).

Thus, multi-task group LASSO is employed for sensor selection in a reconstructive formulation. Stated differently, the exemplary embodiments employ variable selection techniques to choose or select a subset of sensors by considering predictive accuracy directly and the exemplary embodiments do not introduce any direct set function, such as entropy and mutual information. Thus, a sparse modeling approach for variable selection, such as multi-task LASSO is employed, the multi-task LASSO applied in a reconstructive formulation for a set of sensor data. The sensors are selected as a solution of group regularized regression instead of random selection.

Figure 5:
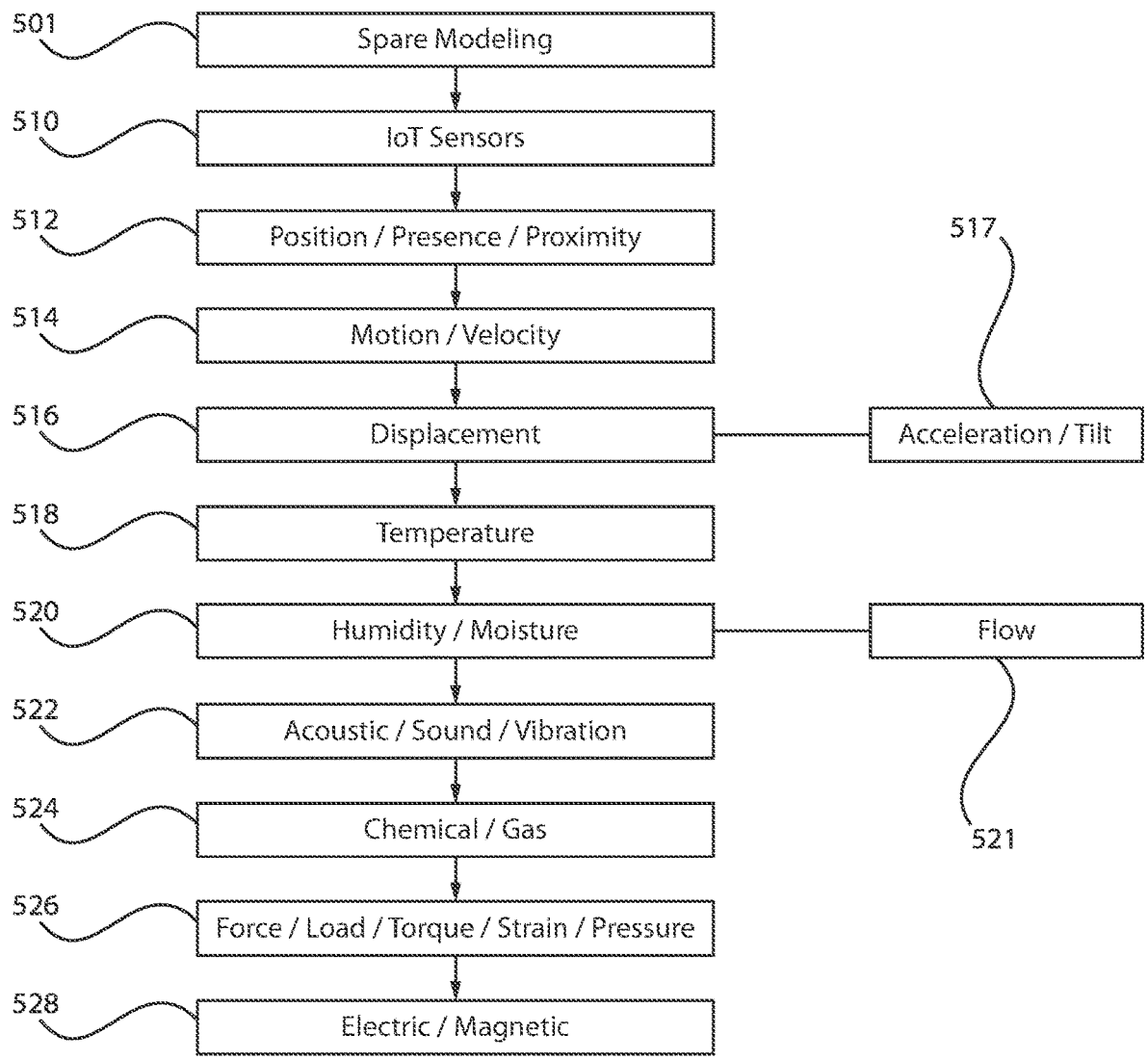
FIG. 5 is a block/flow diagram of exemplary Internet of Things (IoT) sensors used to collect data or information from which a selection can be made by employing the sparse modeling approach, in accordance with embodiments of the present invention.

FIG. 5 is a block/flow diagram of exemplary Internet of Things (IoT) sensors used to collect data or information from which a selection can be made by employing the sparse modeling approach, in accordance with embodiments of the present invention.

IoT enables advanced connectivity of computing and embedded devices through internet infrastructure. IoT involves machine-to-machine communications (M2M), where it is important to continuously monitor connected machines to detect any anomaly or bug, and resolve them quickly to minimize downtime.

The sparse model 501 can be employed to communicate with, e.g., wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The sparse model 501 described herein can communicate with any type of electronic devices for any type of use or application or operation.

IoT (Internet of Things) is an advanced automation and analytics system which exploits networking, sensing, big data, and artificial intelligence technology to deliver complete systems for a product or service. These systems allow greater transparency, control, and performance when applied to any industry or system.

IoT systems have applications across industries through their unique flexibility and ability to be suitable in any environment. IoT systems enhance data collection, automation, operations, and much more through smart devices and powerful enabling technology.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the sparse model 501 of the present invention can communicate with a variety of different devices and/or systems.

IoT loses its distinction without sensors. IoT sensors act as defining instruments which transform IoT from a standard passive network of devices into an active system capable of real-world integration.

The IoT sensors 510 can be connected via the sparse model 501 to transmit information or data, continuously and in in real-time. Exemplary IoT sensors 510 can include, but are not limited to, position/presence/proximity sensors 512, motion/velocity sensors 514, displacement sensors 516, such as acceleration/tilt sensors 517, temperature sensors 518, humidity/moisture sensors 520, as well as flow sensors 521, acoustic/sound/vibration sensors 522, chemical/gas sensors 524, force/load/torque/strain/pressure sensors 526, and/or electric/magnetic sensors 528. One skilled in the art can contemplate using any combination of such sensors to collect data/information and input into the sparse model 501 for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Moreover data collection software can be used to manage sensing, measurements, light data filtering, light data security, and aggregation of data. Data collection software uses certain protocols to aid IoT sensors in connecting with real-time, machine-to-machine networks. Then the data collection software collects data from multiple devices and distributes it in accordance with settings. Data collection software also works in reverse by distributing data over devices. The system can eventually transmit all collected data to, e.g., a central server.

Figure 6:
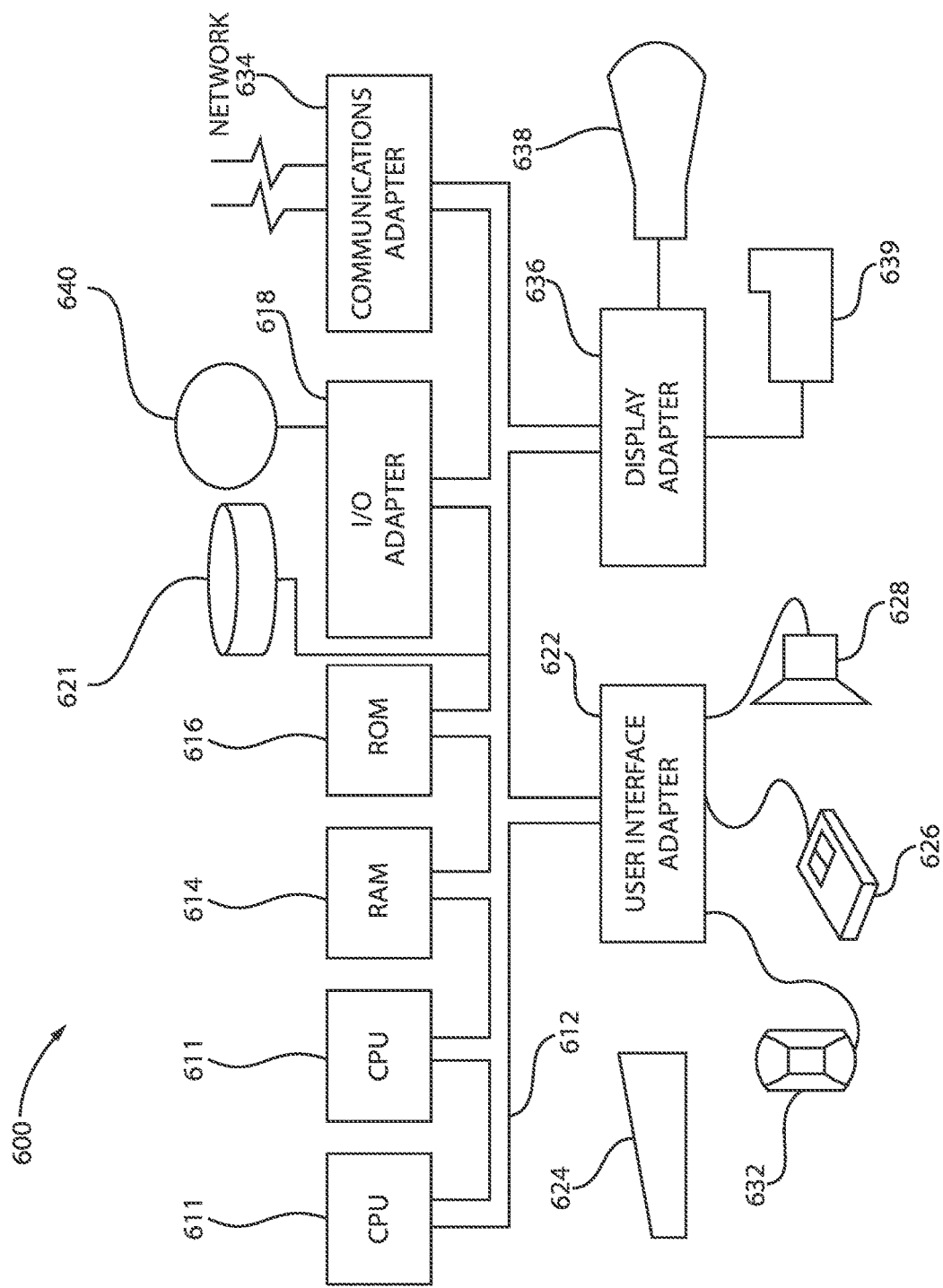
FIG. 6 is an exemplary processing system for running a sparse model, in accordance with embodiments of the present invention.

FIG. 6 is an exemplary processing system for running a sparse model, in accordance with embodiments of the present invention.

Referring now to FIG. 6, this figure shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

Figure 7:
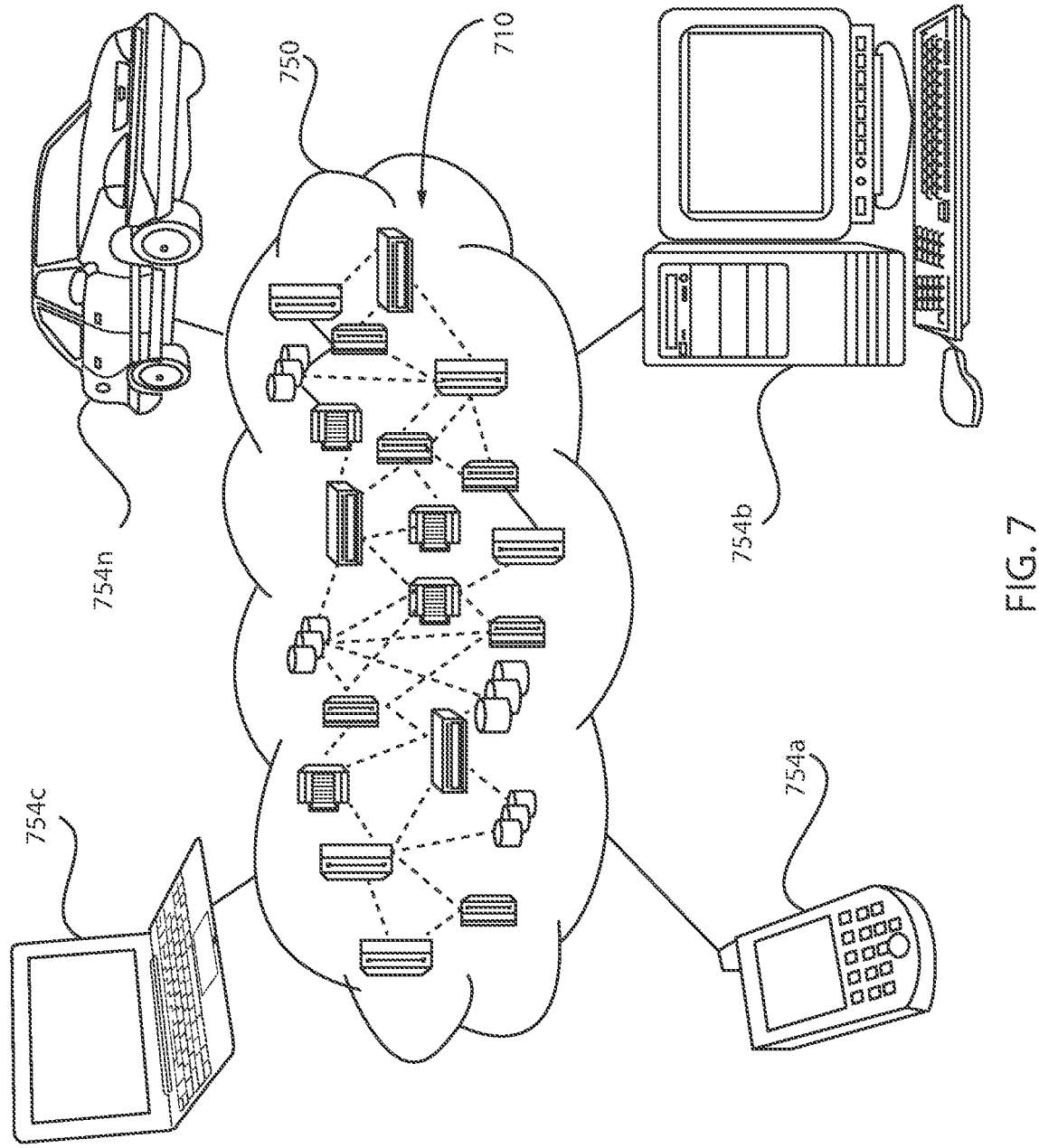
FIG. 7 is a block/flow diagram of an exemplary cloud computing environment, in accordance with an embodiment of the present invention.

FIG. 7 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 750 is depicted for enabling use cases of the present invention. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N can communicate. Nodes 710 can communicate with one another. They can be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
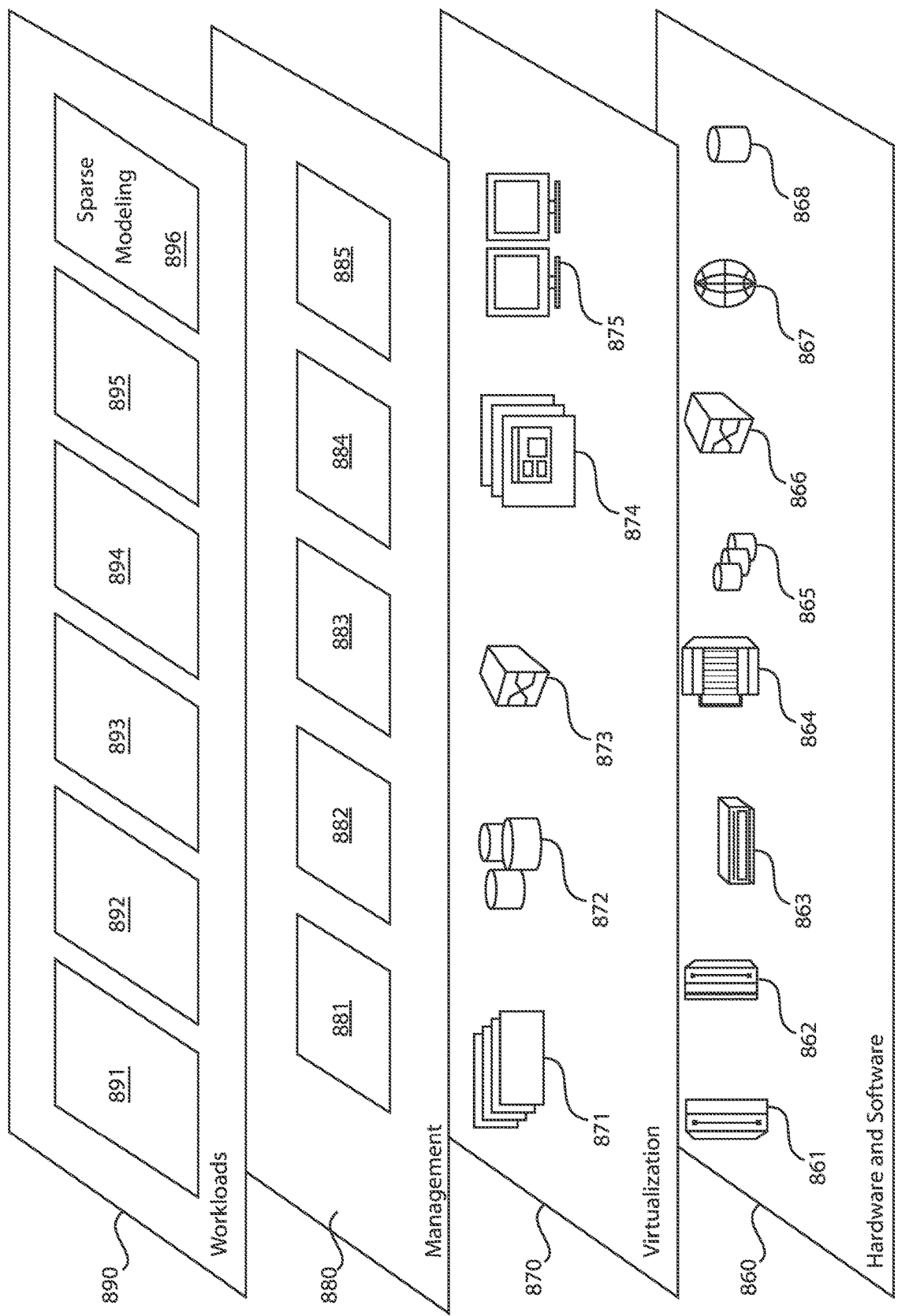
FIG. 8 is a schematic diagram of exemplary abstraction model layers, in accordance with an embodiment of the present invention.

FIG. 8 is a schematic diagram of exemplary abstraction model layers, in accordance with an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities can be provided: virtual servers 871; virtual storage 872; virtual networks 873, including virtual private networks; virtual applications and operating systems 874; and virtual clients 875.

In one example, management layer 880 can provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment can be utilized. Examples of workloads and functions which can be provided from this layer include: mapping and navigation 891; software development and lifecycle management 892; virtual classroom education delivery 893; data analytics processing 894; transaction processing 895; and a sparse model 896.

In summary, the exemplary embodiments of the present invention employ a method or system of accurately sensing in a restricted area, e.g., temperature variations, by using a sparse modelling approach with selective arrangement of a small number of informative sensors. More particularly, the method includes obtaining actual measured values from dispersedly placed sensors in three-dimensional space and applying group regularization for creating models to provide consistency between actual measured values and predicted values. The method further includes selecting a model with a given number of groups from created models where each group has significant coefficients and selectively arranging sensors corresponding to significant coefficients based on selected model for predicting one or more parameters in the indoor area.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for applying sparse modeling for optimizing sensor placement (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer implemented method comprising:

arranging a plurality of sensors in a three-dimensional space;

obtaining actual measured values from the plurality of sensors arranged in the three-dimensional space;

applying group regularization to create one or more models;

selecting a model from the one or more models having a given number of groups, wherein each group has significant coefficients; and according to the selected model, using a subset of the plurality of sensors at locations corresponding to the significant coefficients to predict one or more parameters, including temperature distribution, in the three-dimensional space, wherein the subset of the plurality of sensors used are selected differently than ordinary or standard sensor configurations to provide better and more accurate temperature distribution observations, wherein the model is a Least Absolute Shrinkage and Selection Operator (LASSO) model given as:

$$y_{i1} = x_{i1}w_{11} + x_{i2}w_{21} + \ldots + x_{iM}w_{M1} + \varepsilon_{i1}$$
$$y_{i2} = x_{i1}w_{12} + x_{i2}w_{22} + \ldots + x_{iM}w_{M2} + \varepsilon_{i2}$$
$$\ldots$$
$$y_{iL} = x_{i1}w_{1L} + x_{i2}w_{2L} + \ldots + x_{iM}w_{ML} + \varepsilon_{iL}$$

where $y_{ik}$ and $x_{ij}$ are k-th predicted value or outcome and j-th measured value, respectively for i-th data, $w_{ik}$ is a coefficient to be determined by minimizing an objective function, $\varepsilon_{ik}$ is a noise or an error, M is a group of sensors from the plurality of sensors and L is a set of predictors.

2. The method of claim 1, wherein a value of a significant coefficient of the significant coefficients is obtained to minimize the objective function, the objective function being:

$$\frac{1}{2N}\|Y - XW\|_{Fro}^2 + \alpha \sum_{j=1}^{M} \|w_j\|_2$$

where X is a design matrix where the (i,j)-th element is the j-th observation of the i-th sample, Y is a matrix where the (i,k)-th element is the k-th prediction of the i-th sample, W is a coefficient matrix where the (j,k)-th element is the coefficient corresponding to the j-th observation and the k-th prediction, N represents sampling data points, α is a regularization parameter, and $\|\ \|_{Fro}$ and $\|\ \|_2$ are Frobenius norm and 2-norm, respectively.

3. The method of claim 1, wherein LASSO is applied in a reconstructive formulation for a set of sensor data as follows: let a set of predictions be a set or subset of observations in the LASSO model.

4. The method of claim 1, wherein the plurality of sensors are temperature sensors and the three-dimensional space is a greenhouse.

5. The method of claim 4, wherein the plurality of temperature sensors are placed in a grid formation within the greenhouse.

6. The method of claim 5, wherein the group regularization allows for selection of a subset of the plurality of temperature sensors on the grid to predict temperature distribution within the greenhouse.

7. A non-transitory computer-readable storage medium comprising a computer-readable program executed on a processor in a data processing system, wherein the computer-readable program when executed on the processor causes a computer to perform the steps of:

arranging a plurality of sensors in a three-dimensional space;

obtaining actual measured values from the plurality of sensors arranged in the three-dimensional space;

applying group regularization to create one or more models;

selecting a model from the one or more models having a given number of groups, wherein each group has significant coefficients; and according to the selected model, using a subset of the plurality of sensors at locations corresponding to the significant coefficients to predict one or more parameters, including temperature distribution, in the three-dimensional space, wherein the subset of the plurality of sensors used are selected differently than ordinary or standard sensor configurations to provide better and more accurate temperature distribution observations, wherein the model is a Least Absolute Shrinkage and Selection Operator (LASSO) model given as:

$$y_{i1} = x_{i1}w_{11} + x_{i2}w_{21} + \ldots + x_{iM}w_{M1} + \varepsilon_{i1}$$
$$y_{i2} = x_{i1}w_{12} + x_{i2}w_{22} + \ldots + x_{iM}w_{M2} + \varepsilon_{i2}$$
$$\ldots$$
$$y_{iL} = x_{i1}w_{1L} + x_{i2}w_{2L} + \ldots + x_{iM}w_{ML} + \varepsilon_{iL}$$

where $y_{ik}$ and $x_{ij}$ are k-th predicted value or outcome and j-th measured value, respectively for i-th data, $w_{jk}$ is a coefficient to be determined by minimizing an objective function, $\varepsilon_{ik}$ is a noise or an error, M is a group of sensors from the plurality of sensors and L is a set of predictors.

8. The non-transitory computer-readable storage medium of claim 7, wherein a value of a significant coefficient of the significant coefficients is obtained to minimize the objective function, the objective function being:

$$\frac{1}{2N}\|Y - XW\|_{Fro}^2 + \alpha \sum_{j=1}^{M} \|w_j\|_2$$

where X is a design matrix where the (i,j)-th element is the j-th observation of the i-th sample, Y is a matrix where the (i,k)-th element is the k-th prediction of the i-th sample, W is a coefficient matrix where the (j,k)-th element is the coefficient corresponding to the j-th observation and the k-th prediction, N represents sampling data points, $\alpha$ is a regularization parameter, and $\|\ \|_{Fro}$ and $\|\ \|_2$ are Frobenius norm and 2-norm, respectively.

9. The non-transitory computer-readable storage medium of claim 7, wherein LASSO is applied in a reconstructive formulation for a set of sensor data as follows: let a set of predictions be a set or subset of observations in the LASSO model.

10. The non-transitory computer-readable storage medium of claim 7, wherein the plurality of sensors are temperature sensors and the three-dimensional space is a greenhouse.

11. The non-transitory computer-readable storage medium of claim 10, wherein the plurality of temperature sensors are placed in a grid formation within the greenhouse.

12. The non-transitory computer-readable storage medium of claim 11, wherein the group regularization allows for selection of a subset of the plurality of temperature sensors on the grid to predict temperature distribution within the greenhouse.

13. A system comprising:
a memory; and
one or more processors in communication with the memory configured to:
arrange a plurality of sensors in a three-dimensional space;
obtain actual measured values from the plurality of sensors arranged in the three-dimensional space;
apply group regularization to create one or more models;
select a model from the one or more models having a given number of groups, wherein each group has significant coefficients; and
according to the selected model, use a subset of the plurality of sensors at locations corresponding to the significant coefficients to predict one or more parameters, including temperature distribution, in the three-dimensional space, wherein the subset of the plurality of sensors used are selected differently than ordinary or standard sensor configurations to provide better and more accurate temperature distribution observations,
wherein the model is a Least Absolute Shrinkage and Selection Operator (LASSO) model given as:

$$y_{i1} = x_{i1}w_{11} + x_{i2}w_{21} + \ldots + x_{iM}w_{M1} + \varepsilon_{i1}$$
$$y_{i2} = x_{i1}w_{12} + x_{i2}w_{22} + \ldots + x_{iM}w_{M2} + \varepsilon_{i2}$$
$$\ldots$$
$$y_{iL} = x_{i1}w_{1L} + x_{i2}w_{2L} + \ldots + x_{iM}w_{ML} + \varepsilon_{iL}$$

where $y_{ik}$ and $x_{ij}$ are k-th predicted value or outcome and j-th measured value, respectively for i-th data, $w_{ik}$ is a coefficient to be determined by minimizing an objective function, $\varepsilon_{ik}$ is a noise or an error, M is a group of sensors from the plurality of sensors and L is a set of predictors.

14. The system of claim 13, wherein a value of a significant coefficient of the significant coefficients is obtained to minimize the objective function, the objective function being:

$$\frac{1}{2N}\|Y - XW\|_{Fro}^2 + \alpha \sum_{j=1}^{M} \|w_j\|_2$$

where X is a design matrix where the (i,j)-th element is the j-th observation of the i-th sample, Y is a matrix where the (i,k)-th element is the k-th prediction of the i-th sample, W is a coefficient matrix where the (j,k)-th element is the coefficient corresponding to the j-th observation and the k-th prediction, N represents sampling data points, $\alpha$ is a regularization parameter, and $\|\ \|_{Fro}$ and $\|\ \|_2$ are Frobenius norm and 2-norm, respectively.

15. The system of claim 13, wherein LASSO is applied in a reconstructive formulation for a set of sensor data as follows: let a set of predictions be a set or subset of observations in the LASSO model.

16. The system of claim 13, wherein the plurality of sensors are temperature sensors and the three-dimensional space is a greenhouse.

17. The system of claim 16, wherein the plurality of temperature sensors are placed in a grid formation within the greenhouse.

* * * * *